(12) United States Patent
Buragohain (10) Patent No.: US 8,024,458 B1
(45) Date of Patent: Sep. 20, 2011

(54) TRACKING THE FREQUENCY DISTRIBUTION OF STREAMING VALUES

(75) Inventor: Chiranjeeb Buragohain, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 354 days.

(21) Appl. No.: 12/121,846

(22) Filed: May 16, 2008

(51) Int. Cl.
*G06F 15/173* (2006.01)
(52) U.S. Cl. ............................................. 709/224
(58) Field of Classification Search ............ 709/224
See application file for complete search history.

(56) References Cited

U.S. PATENT DOCUMENTS 5,892,937 A * 4/1999 Caccavale .................. 711/135
5,960,435 A * 9/1999 Rathmann et al. ............... 1/1

\* cited by examiner

*Primary Examiner* — Kenny Lin
*Assistant Examiner* — Farhad Ali
(74) *Attorney, Agent, or Firm* — Thomas, Kayden, Horstemeyer & Risley, LLP.

(57) ABSTRACT

Disclosed are various embodiments for tracking a frequency distribution of streamed values. A stream of monitoring values is generally received in a host from a plurality of external hosts. A frequency distribution is stored in the host, the frequency distribution comprising a plurality of ranges that vary exponentially, and a plurality of frequency values, each of the frequency values being associated with a corresponding one of the ranges. A frequency at which the monitoring values fall within respective ones of the ranges is tracked in the frequency distribution.

23 Claims, 4 Drawing Sheets

| R | Left Edge | Right Edge | Width | Freq Value |
|---|---|---|---|---|
| 1 | 1.0000 | 1.0300 | 0.0300 | 1548 |
| 2 | 1.0300 | 1.0609 | 0.0309 | 1564 |
| 3 | 1.0609 | 1.0927 | 0.0318 | 1954 |
| 4 | 1.0927 | 1.1255 | 0.0328 | 4861 |
| 5 | 1.1255 | 1.1593 | 0.0338 | 8736 |
| 6 | 1.1593 | 1.1941 | 0.0348 | 5191 |
| 7 | 1.1941 | 1.2299 | 0.0368 | 5494 |

TRACKING THE FREQUENCY DISTRIBUTION OF STREAMING VALUES

BACKGROUND

In large scale server banks operated by various entities, it is often the case that service level agreements are in place that ensure a predefined level of performance. It can be the case that such servers may generate vast amounts of reporting data from which compliance with a service level agreement or other requirement may be ascertained. Unfortunately, when the amount of such data is very large, significant processing and data storage resources are needed to process such reporting data to ascertain compliance with service level agreements or other requirements.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
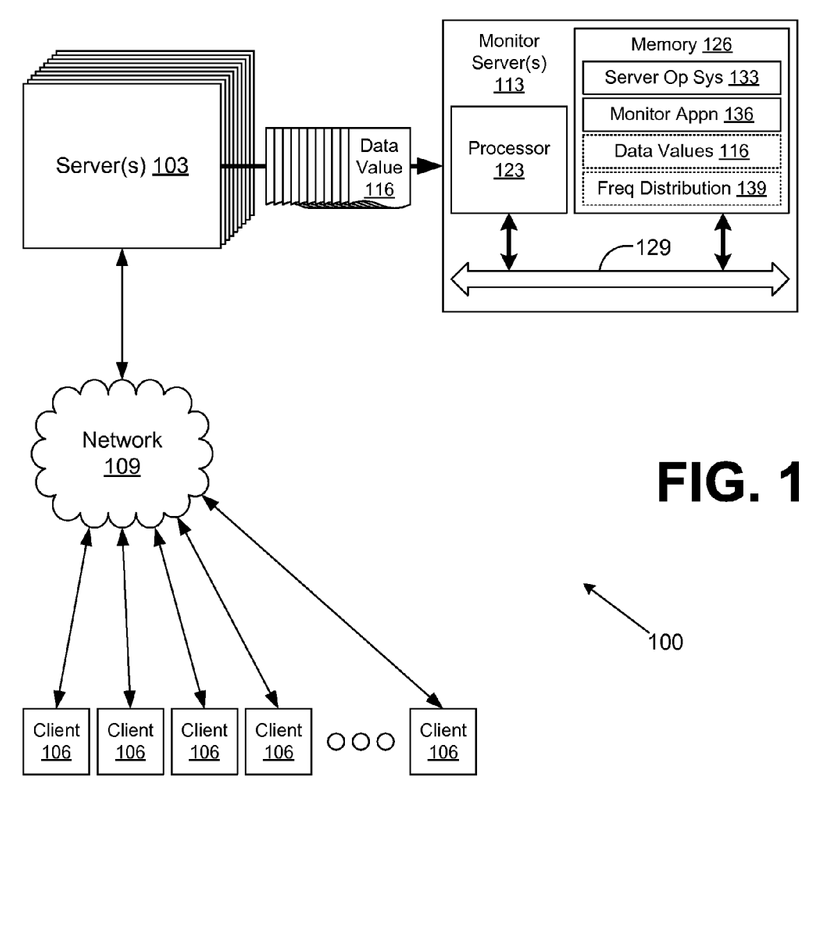
FIG. 1 is a drawing of one example of a data communication network that includes servers that respond to requests from clients, where the servers generate monitoring data that is applied to one or more monitor servers according to various embodiments of the present disclosure.

With reference to FIG. 1, shown is a data communication network 100 according to various embodiments. The data communication network 100 includes a plurality of servers 103 that are in data communication with a plurality of clients 106 through an appropriate network 109. The network 109 may comprise, for example, the Internet, intranets, wide area networks (WANs), local area networks, wireless networks, or other suitable networks, etc., or any combination of two or more such networks.

Each of the servers 103 comprises a host that performs various functions in order to respond to requests by the clients 106. In this respect, the servers 103 may perform various services in order to implement the functionality of an online merchant or other entity. For example, each of the servers 103 may employ web server technology or other type of server technology to respond to requests received from clients 106. To this end, the clients 106 may execute browser applications or other applications in communicating with the servers 103 as can be appreciated. Each of the servers 103 may be considered a host upon which various server applications may be executed as can be appreciated.

The data communication network 100 also includes one or more monitor servers 113. The one or more monitor servers 113 act as hosts that implement various monitoring applications and/or other applications as can be appreciated. According to one embodiment, the monitor servers 113 receive a stream of data values 116 from the various servers 103. As contemplated herein, a data value 116 is "received" by the monitor server 113 when it is read into a memory 126 or other memory/buffer of the monitor server 113, or is otherwise accessible by the processor circuit of the monitor server 113 as can be appreciated. As such, data that is "received" by the monitor server 113 may be stored within an input buffer as can be appreciated. Alternatively, data may be received by being stored in memory external to the monitor server 113 where such memory may be accessed by the monitor server 113.

The data values 116 may comprise, for example, monitoring values associated with the operation of the servers 103, or other data as will be described. For example, the monitoring values may reflect server latencies in responding to client request, sizes of files served up to clients 106, or other information associated with the operation of the servers 103.

The monitor server 113 acts as a host for the various applications executed thereon. The monitor server(s) 113 comprises, for example, one or more processor circuits having a processor 123 and a memory 126, both of which are coupled to a local interface 129. Several applications and other components may be stored in the memory 126 and executable by the processor 123. Such applications may comprise, for example, a server operating system 133, a monitor application 136, or other applications. Also, the data values 116 received from the servers 103 may be stored in the memory 126 for at least a short period of time as will be described. Further, a frequency distribution 139 generated based upon the data values 116 may also be maintained in the memory 126.

Next, a general discussion of the operation of the various components of the data communications network 100 is provided. To begin, the clients 106 generate requests that are transmitted to one or more of the servers 103. These requests may be, for example, generated using a browser or other appropriate application that interfaces with various server applications executed by the servers 103 acting as hosts for such applications. Such server applications generate responses to the requests and transmit them back to the clients 106 via the network 109. In generating the responses, the servers 103 may also generate data values 116 that are transmitted as a data stream to the one or more monitor servers 113.

The data values 116 may relate to the operation of the servers 103 in responding to the various requests of the clients 106. For example, assume that the operator of the servers 103 has implemented a service level agreement (SLA) for web server applications or other server applications executed in the servers 103. Assume that the SLA mandates that the servers 103 shall generate the responses to all requests from clients 106 and transmit such responses on the network 109 to the client 106 within two seconds or less for 99 percent of the requests in any five minute period. Alternatively, the SLA may dictate other terms for server latency as can be appreciated.

For each request received within a given five minute period, an appropriate server application is configured to generate a report of the server latency associated with generating the response to the request. This server latency value is transmitted to the monitor server 113 as a data value 116. In cases where the servers 103 respond to a relatively high volume of requests from clients 106, the server latencies associated with the corresponding responses generated are provided to the monitor servers 113 as the data values 116 in a constant stream. For example, assuming that the servers 103 handled approximately 100,000 requests within five minutes, then a corresponding number of server latencies are sent as data values 116 to the monitor server 113 for processing.

In addition, the data values 116 may include parameters other than server latencies as described above. For example, the data values 116 may include file sizes associated with the responses generated by the servers 103, where the servers 103 transmit various files in response to the requests received from the clients 106. The data values 116 may also include any one of a number of different other types of data that provide a benchmark or measurement of the operation of the servers 103, or for some other purpose. Thus, ultimately a stream of data values 116 that are values associated with the operation of the servers 103 or relating to some other factor is transmitted to the monitor server 113. Each data value 116 may be transmitted in the form of a report or log generated based upon an event in the servers 103 such as the generation of a response in reply to a request from a client 106.

If we assume for purposes of illustration that the data values 116 comprise server latencies as described above, then the server latencies received from the servers 103 may be processed in order to ensure compliance with a given SLA as described above. However, assuming that the servers 103 handle very large numbers of requests from a multitude of clients 106 such as might be the case where the network 109 comprises the Internet, etc., there will be a correspondingly large number of server latencies that are transmitted in the data stream to the one or more monitor servers 113. Accordingly, a significant amount of data values 116 comprising the server latencies would be stored in one or more memories 126 associated with the monitor servers 113 from which compliance with the SLA may be determined.

In situations where the number of data values 116 is very large due to the very large number of responses generated by the servers 103, then significant processing resources will be needed to monitor compliance with a given SLA. Also, significant amounts of memory 126 may be needed to store all of the data values 116 as they are received. For very large scale server systems that generate data values 116 on a megabyte scale, gigabyte scale, or greater, the resources needed to store such data can be quite expensive.

Thus, given that the amount of data received from the servers 103 and stored as data values 116 in the memory 126 can be significant, it follows that calculating the compliance of server latency for a given SLA (i.e. calculating a $99^{th}$ percentile server latency) from all of the data values 116 may be a bit burdensome in terms of the amount of memory 126 necessary to store the data values 116 and the amount of calculations that must be performed.

According to one embodiment, in order to minimize the amount of data that will have to be stored in the memory 126 that is received from the servers 103, the frequency distribution 139 is created to limit the total amount of memory 126 needed to determine compliance with a given SLA. According to various embodiments, the frequency distribution 139 may facilitate calculation of compliance with a given SLA within a predefined tolerance as will be further described below.

The frequency distribution 139 is made up of a plurality of ranges that vary exponentially. Also, the frequency distribution 139 includes a plurality of frequency values. Each respective frequency value is associated with a corresponding one of the ranges. Stated another way, associated with every one of the ranges is a single frequency value.

The frequency distribution 139 is employed to track a frequency at which the server latency values or other values fall within the respective ones of the ranges in the frequency distribution 139. A total number of ranges and, correspondingly, a total number of frequency values of the frequency distribution 139 are predefined as will be described.

Frequency distribution 139 ultimately comprises a predefined number of frequency values stored in the form of an array or table within the memory 126. Where memory resources are limited, then it is desirable that the frequency distribution 139 be of limited size. It follows that when the number of values received from the servers 103 in the form of data values 116 is less than the total number of ranges of a frequency distribution 139, then storage of the values received from the servers 103 in their original form will use less storage than the frequency distribution 139 itself.

Thus, when a stream of data values 116 is first received in the monitor server(s) 113, an initial quantity of the data values 116 are stored in memory 126. In one embodiment, the frequency distribution 139 is created in the memory 126 only when the initial quantity of data values 116 received from the servers 103 have reached a total number that is equal to the number of frequency values associated with the frequency distribution 139. In this respect, the total memory 126 employed is minimized. In addition, when identical ones of the respective values obtained from the servers 103 are received, they may be consolidated into a single value, where the single value is counted in the initial quantity of values as equivalent to one of the system values as will be described.

Once the frequency distribution 139 has been created, then the frequency at which values fall within respective ones of the ranges in the frequency distribution 139 is tracked by incrementing the frequency value associated with a respective one of the ranges for every single one of the values received in the monitor server 113 from a respective server 103.

After a respective one of the frequency values has been incremented for a corresponding one of the data values 116 received from a server 103, then the data value 116 is discarded. Ultimately, the frequency value stored in the frequency distribution 139 may be employed to calculate approximate compliance with an SLA or other purpose for the period of time for which the data values 116 are received by the monitor servers 113. Rather than keeping each one of the data values 116 such as server latency values in the memory 126, only the frequency values associated with the frequency distribution 139 are stored in the memory 126, thereby reducing the amount of memory 126 needed in order to determine compliance with a given SLA.

In addition, some of the data values 116 received from a respective server 103 may be greater than a total upper limit of the uppermost range of the frequency distribution 139. If such is the case, then the frequency distribution 139 may need to be expanded so that such data values 116 fall within a given range of the frequency distribution 139. In particular, frequency distribution 139 may be expanded with or without increasing a total number of ranges within the frequency distribution 139.

Where ranges are added to a given frequency distribution 139 in order to expand the frequency distribution 139, then an initial quantity of values may be stored in the memory 126 that fall outside an upper limit of the frequency distribution 139 up to the total number of ranges that would be added during an expansion of a frequency distribution 139. Again, this approach minimizes the amount of memory 126 that needs be used as can be appreciated. In order to expand the frequency distribution 139 by adding ranges, the number of ranges of the frequency distribution 139 are doubled. When a frequency distribution 139 is expanded without adding new ranges, then existing adjacent ranges are combined by adding the frequency values of such ranges and new ranges are added so that the total number of ranges does not change. In doing so, however, the error inherent in calculating the compliance with a given SLA is increased, although such an increase may not be of significance.

Figure 2:
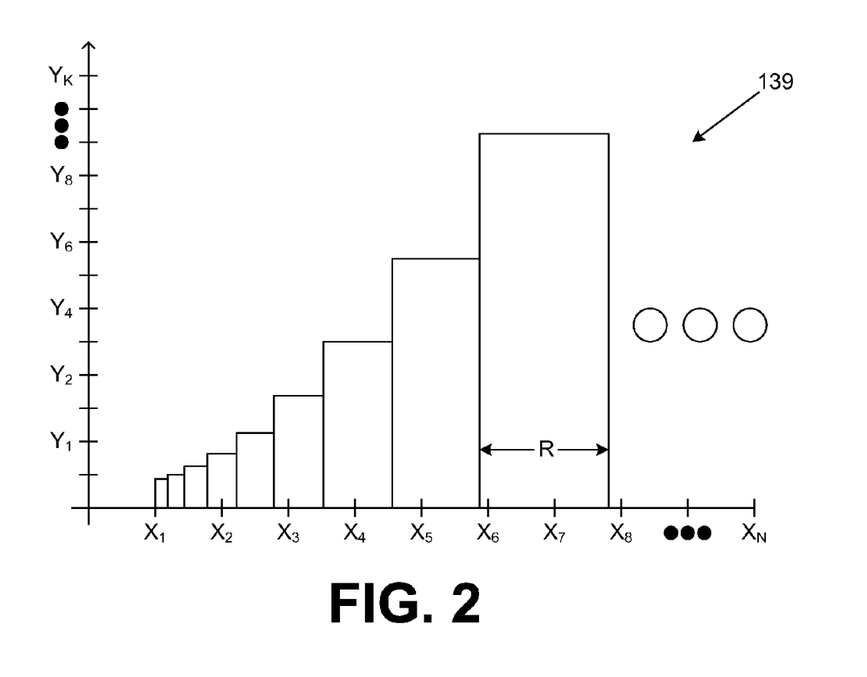
FIG. 2 is a graph that illustrates one example of an exponential frequency distribution maintained in the monitor server(s) of FIG. 1 according to an embodiment of the present disclosure.

With reference to FIG. 2, shown is a graphical depiction of one example of an exponential frequency distribution 139 according to various embodiments. As shown in FIG. 2, the frequency distribution 139 includes several ranges R, each including a left edge and a right edge, where the height of the bars associated with each range R indicates the frequency value for such range. Assuming that an acceptable relative error $\epsilon$ in the values for each range R which may be, for example, 3% or other value, then the exponential histogram schema uses the following scheme for the respective ranges as follows:

$$[1,(1+\epsilon)], [(1+\epsilon),(1+\epsilon)^2], [(1+\epsilon)^2,(1+\epsilon)^3], \ldots,$$

where $\epsilon$ is the relative error as defined above. Since there are B ranges in total in the frequency distribution 139, then the rightmost range R is given by:

$$\lfloor (1+\epsilon)^{B-1},(1+\epsilon)^B \rfloor$$

Thus, $\epsilon$ may be calculated as $$\varepsilon = \frac{1}{B}\log U,$$

where U is equal to the value of the right edge of the rightmost range R in the frequency distribution 139, and B is equal to the total number of ranges R. Based upon knowing these factors, the error for the placement of any given value with any given one of the ranges R in the exponential histogram may be calculated as follows:

$$\text{error} = \frac{(1+\varepsilon)^k - (1+\varepsilon)^{k-1}}{(1+\varepsilon)^{k-1}} = \varepsilon.$$

Figure 3:
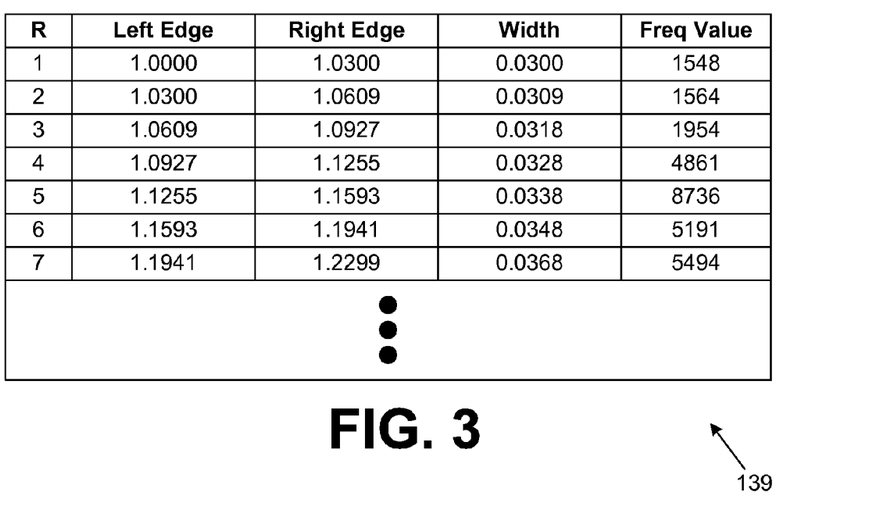
FIG. 3 is an example of a table that is maintained in a memory of the monitor server(s) of FIG. 1, the table representing the exponential frequency distribution of FIG. 2 according to an embodiment of the present disclosure.

With reference then to FIG. 3, shown is a table that depicts the ranges R in terms of values for the left and right edges of the ranges R and their corresponding widths. The values in the table of FIG. 3 are calculated, for example, where $\epsilon$=0.03. Also, the table depicted in FIG. 3 is employed to track frequency values associated with each one of the ranges R. In one embodiment, the frequency distribution 139 may be maintained in the memory 126 in the form of a table similar to that shown in FIG. 3.

Figure 4:
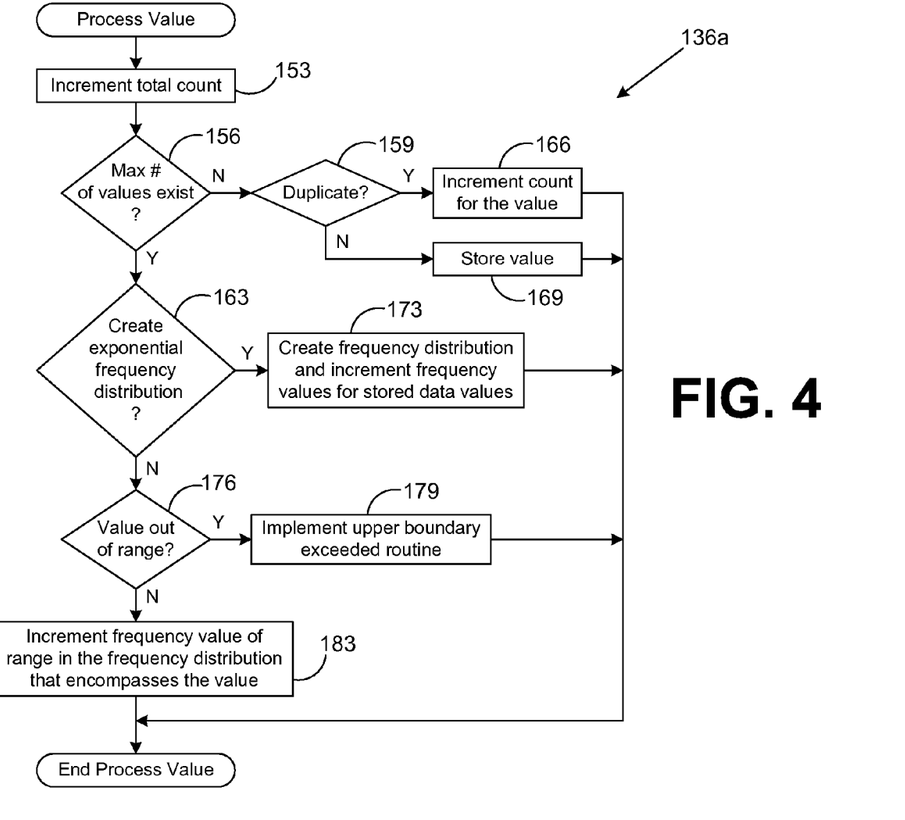
FIG. 4 is a flowchart that provides one example of the functionality of monitor logic executed in the monitor server(s) of FIG. 1 according to an embodiment of the present disclosure.

With reference to FIG. 4, shown is one example flowchart that illustrates one example of a portion of the monitor application 136, denoted herein as monitor application 136a, that is implemented in order to process data values 116 (FIG. 1) received in the monitor server 113 (FIG. 1) from the servers 103 (FIG. 1) according to one embodiment. Alternatively, the flowchart of FIG. 4 may be viewed as depicting steps of an example method implemented in the monitor server 113. The monitor application 136a is executed each time a data value 116 is received in the monitor server 113 to process such data value 116 as will be described.

Beginning with box 153, the monitor application 136a increments a count of the total number of data values 116 received from the servers 103. In this respect, the total count may be maintained in an appropriate location in the memory 126 (FIG. 1) or other appropriate location as can be appreciated. This is done so as to maintain a total count of the data values 116 received from the servers 103. Then, in box 156, the monitor application 136a determines whether a number of the data values 116 have been received in the monitor server 103 that is equal to the total number of ranges R in an exponential frequency distribution 139 (FIG. 1) that is to be created in the memory 126. The maximum number of ranges R that is to be employed for frequency distribution 139 may be predetermined and stored in the memory 126 so as to be able to make the comparison in box 156. For example, the total number of ranges may be 4,096 or some other value.

If the total number of data values 116 is not greater than or equal to the maximum number of ranges in the frequency distribution 139, then the monitor application 136a proceeds to box 159. Otherwise, the monitor application 136a proceeds to box 163. In this manner, the frequency distribution 139 is not created until there are an initial number of data values 116 received from the servers 103 that is greater than or equal to the ranges R in the frequency distribution 139 to be created, thereby saving on the amount of memory 126 needed for storage of data values 116 or frequency values. If the initial number of data values 116 received from the servers 103 and stored in the memory 126 never approaches the total number of ranges R in a frequency distribution 139, then the frequency distribution 139 is never created and compliance with an SLA or other calculation may be performed using the stored data values 116 themselves. As an alternative, the initial number of data values 116 stored may be greater than the number of ranges R before the frequency distribution 139 is created where various ones of the data values 116 are duplicates as will be described.

In box 159, the monitor application 136a determines whether the data value 116 received is a duplicate of a previous value received and stored in the memory 126. Note that the data values themselves are stored in the memory 126 until the total number of data values 116 stored is equal to the total number of ranges R maintained in a given frequency distribution 139 as described above. The maximum number of values stored in the memory 126 would be equal to the total number of ranges R in the frequency distribution 139, thereby limiting the total amount of memory 126 needed in order to determine compliance with a service level agreement or for some other purpose as described above. Assuming that the data value 116 is determined to be a duplicate in box 159 of a previously stored data value 116, then the monitor application 136a proceeds to box 166 in which a count for that particular value is incremented so as to consolidate identical ones of the stored data values 116 into a single value.

The single value is counted in the initial quantity of data values 116 received as equivalent to a single one of the data values 116 when determining whether the maximum number of data values 116 has been reached in box 156. Thus, it is possible that the total number of data values 116 received before generating an actual frequency distribution 139 may be greater than the total number of ranges R in the frequency distribution 139 where occurrences of duplicates are tracked using appropriate frequency counts. Thereafter, the monitor application 136a ends as shown.

However, assuming that there is no duplicate value for the current data value 116 that was previously stored in the memory 126, then the monitor application 136a proceeds to box 169 in which the data value 116 is stored in the memory 126 in an appropriate location. Thereafter, monitor application 136a ends as having processed the current data value 116.

If storage of the current data value 116 received from the servers 103 would result in more data values 116 being stored in the memory 126 than ranges R of the frequency distribution 139 as determined in box 156, then the monitor application 136a proceeds to box 163 in which it is determined whether the exponential frequency distribution 139 had previously been created. If so, then the monitor application 136a proceeds to box 173. Otherwise, the monitor application 136a proceeds to box 176.

In box 173, the frequency distribution 139 is created in the memory 126 and any data values 116 stored in the memory 126 are noted in the frequency distribution 139. In order to do so, each frequency value associated with a given one of the ranges R is incremented each time one of the stored or newly received data values 116 falls within the given one of the ranges R. Thereafter, the monitor application 136a ends as shown.

Assuming that the frequency distribution 139 already exists as determined in box 163, then monitor application 136a proceeds to box 176. In box 176, the monitor application 136a determines whether the current data value 116 exceeds the upper limit of the entire frequency distribution 139 such that the data value 116 does not fall within any of the ranges R of the frequency distribution 139. Stated another way, such a data value 116 would fall to the right of the ranges R. If such is the case, then the monitor application 136a proceeds to box 179. Otherwise, the monitor application 136a proceeds to box 183.

In box 179, the monitor application 136a implements an appropriate "upper boundary exceeded" routine. An upper boundary exceeded routine may involve the expansion of the frequency distribution 139 in order to accommodate the data value 116 that extends beyond the upper limit of the frequency distribution 139. Alternatively, other action may be taken.

Assuming that in box 176 the data value 116 falls within a respective one of the ranges of the frequency distribution 139, then in box 183 the monitor application 136a increments the frequency value of the respective one of the ranges R. Thereafter, the monitor application 136a ends as shown.

Figure 5A:
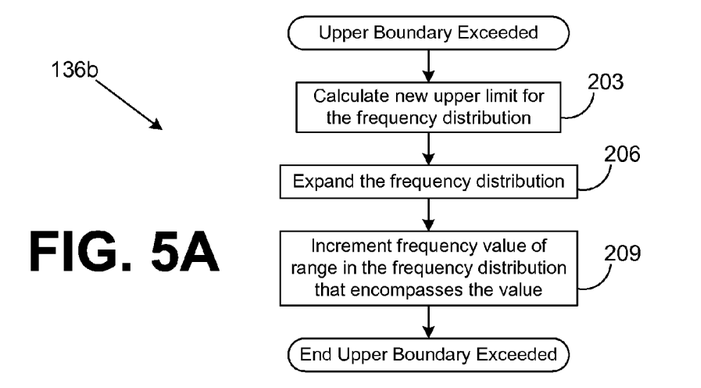
FIGS. 5A and 5B are flowcharts that provide further examples of the functionality of the monitor logic executed in the monitor server(s) of FIG. 1 according to an embodiment of the present disclosure.

Referring next to FIG. 5A, shown is a flowchart that provides one example of another portion of the monitor application 136, denoted herein as monitor application 136b. The flowchart of FIG. 5A illustrates a portion of the monitor application 136b that comprises one embodiment of an upper boundary exceeded routine implemented in box 179 (FIG. 4) as described above. Alternatively, the flowchart of FIG. 5A may be viewed as depicting further steps of an example method implemented in the monitor server 113 (FIG. 1).

Beginning with box 203, given that a data value 116 has fallen outside of the frequency distribution 139 (FIG. 1) in that it is a value that is greater than the right edge of the uppermost range R (FIG. 2) in the frequency distribution 139, then in box 203 a new upper limit for the frequency distribution 139 is calculated. This may be done, for example, by squaring the current upper limit to obtain a new value as can be appreciated.

Thereafter, in box 206, the frequency distribution 139 is expanded. This may be done by expanding without adding new ranges R to the frequency distribution 139. In such case, existing adjacent pairs of the ranges R are consolidated into a single range R starting from left to right in order to reduce the total number of ranges across the preexisting frequency distribution 139 by one half. Then, new ranges R are added for the new portion of the frequency distribution 139 up to the new upper limit. In the end, the total number of ranges R will remain the same, however the widths of the ranges R themselves are expanded. It should be noted that an error exists when specific data values 116 are accounted for in a given frequency value of a range R. Specifically, since the specific data value 116 is not maintained, then all that is known is that a value was received that falls within the given range R as noted by incrementing the corresponding frequency value. Thus, there is an inherent error based on the relative widths of the ranges R as described above. When a frequency distribution 139 is expanded as described above, the error is increased accordingly. However, in some cases, the increased error may be acceptable.

Alternatively, the frequency distribution 139 can be expanded by adding new ranges R to the existing ranges R of the frequency distribution 139 up to the new upper limit. In one embodiment, the number of ranges R is doubled in this manner. Ultimately, this results in having to store double the range information and frequency values in the memory 126 for the frequency distribution 139. Where memory resources are limited, this may not be desirable. However, expansion of the frequency distribution 139 in this manner does not increase the error associated with the frequency distribution 139.

Thereafter, in box 209, the frequency value of the range R in the frequency distribution 139 that encompasses the data value 116 is incremented. This accounts for the data value 116 after the frequency distribution 139 has been expanded as described above. Thereafter, this portion of the monitor application 136b ends as shown.

Figure 5B:
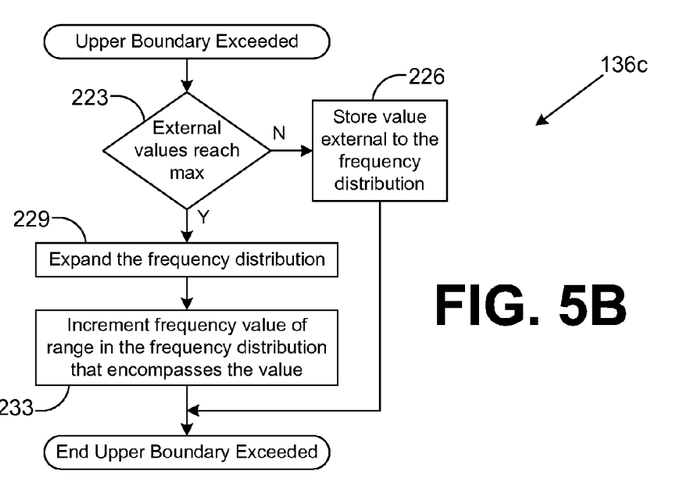

Referring next to FIG. 5B, shown is a flowchart that provides yet another example of a portion of the monitor application 136, denoted herein as monitor application 136c. The flowchart of FIG. 5B illustrates a portion of the monitor application 136c that comprises another embodiment of an upper boundary exceeded routine implemented in box 179 (FIG. 4) as described above. Alternatively, the flowchart of FIG. 5B may be viewed as depicting further steps of an example method implemented in the monitor server 113 (FIG. 1).

As illustrated in the flowchart of FIG. 5B, the expansion of the frequency distribution 139 (FIG. 1) is delayed until a number of data values 116 (FIG. 1) is obtained outside the existing frequency distribution 139 that would equal the number of ranges R that are to be added to the frequency distribution 139 during the expansion.

To begin, in box 223 it is determined whether the number of data values 116 that fall outside of the frequency distribution 139 has reached a number equal to the total number of ranges R in the frequency distribution 139. In this case, it is assumed that expansion of the frequency distribution 139 will entail doubling the number of ranges R. Note that duplicates of the data values 116 may be tracked as single data values 116 as described above. In this respect, it is desirable to save memory space by not expanding the frequency distribution 139 until it is deemed necessary based upon the total number of data values 116 that have exceed the number of ranges R of the frequency distribution 139.

If the number of data values 116 (including consolidated values) has not reached the total number of ranges R to be added to accommodate an expansion of the frequency distribution 139, then in box 226 the data value 116 is stored externally to the frequency distribution 139. Thereafter, the upper boundary exceeded routine of the monitor application 136c ends as shown. Otherwise, the monitor application 136c proceeds to box 229 in which the frequency distribution 139 is expanded. This is done by adding ranges R to the frequency distribution 139 as described above. Since ranges R are added to the frequency distribution 139, any error that results due to the use of the ranges R is equal to the error that was originally calculated for the frequency distribution 139 before expansion. Once expanded, in box 233 the monitor application 136c increments the frequency value of the respective range in the frequency distribution 139 that encompasses the current data value 116. Then, the monitor application 136c ends as shown.

Figure 6:
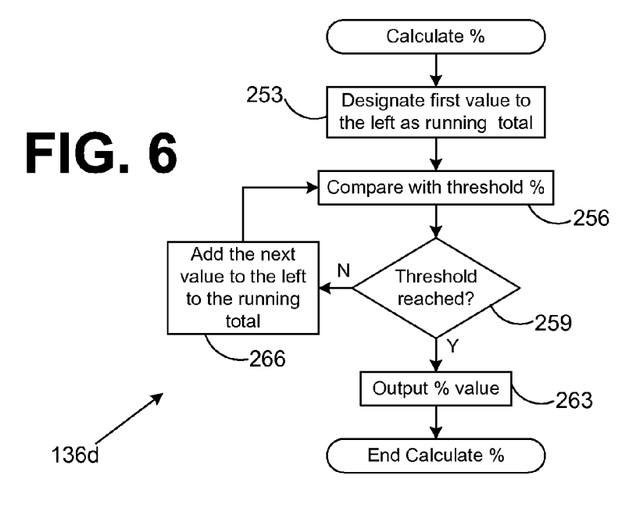
FIG. 6 is a flow chart that provides yet another example of the functionality of the monitor logic executed in the monitor server(s) of FIG. 1 according to an embodiment of the present disclosure.

Referring next to FIG. 6, shown is a flowchart that provides one example of another portion of the monitor application 136, denoted herein as monitor application 136d. The monitor application 136d is implemented in order to calculate a predefined percentile of data values 116 (FIG. 1) that fall below a given value as will be described. Alternatively, the flowchart of FIG. 6 may be viewed as depicting steps of an example method implemented in the monitor server 113 (FIG. 1).

The flowchart of FIG. 6 provides one illustration of how the frequency distribution 139 (FIG. 1) generated by a given number of data values 116 may be employed to determine compliance with a SLA or for some other purpose. However, to provide an illustration, a scenario is discussed below in which compliance with an SLA is determined, although it is understood that the frequency distribution 139 may be employed for other purposes. Thus, this scenario is provided as one illustration of the many different ways that the frequency distribution 139 may be employed in determining a percentile value as will be described.

Before discussing FIG. 6 in detail, first a scenario is described for which the frequency distribution 139 is to be employed in calculating compliance for an SLA to facilitate a greater understanding of the functionality as described in FIG. 6. In particular, assume that an SLA specifies that the server latency in responding to requests from clients 106 (FIG. 1) is to be two seconds or less for 99 percent of the requests in any five minute period. Also, assume that in a given five minute period, the servers 103 (FIG. 1) have served 100,000 requests. Given that 100,000 requests have been served, then a corresponding 100,000 data values 116 representing the respective server latencies for each request are received by the monitor server 113 (FIG. 1).

Further assume that the frequency distribution 139 employed to track the occurrences of the server latencies has 4,096 ranges R. Thus, if we add all of the frequency values associated with all of the ranges R of the frequency distribution 139, then we will get the total number of data values 116 received, namely, 100,000. Given that this information is contained within the frequency distribution 139, we may then determine whether 99 percent of the 100,000 requests served have a server latency of less than two seconds. We note that each one of the ranges R specifies a range of latency values. Thus, the latency value associated with a given range R may be specified as the left end value of the range R. Alternatively, the latency value associated with a given range R may be specified at the middle of the range plus or minus one half the width of the range R. Still further, the latency value may be any value within the range R or at either endpoint (left or right) of the range R.

Let us assume, for example, that a range R is the k-th range (i.e. the left end of the range is $(1+\epsilon)^{k-1}$, and the right end of the range R is $(1+\epsilon)^k$. Since received latency values that fall within this range R can lie at any location between these two limits, the total error in estimating the latency is $(1+\epsilon)^k-(1+\epsilon)^{k-1}$ and the relative error is at most equal to $$\varepsilon = \frac{(1+\varepsilon)^k - (1+\varepsilon)^{k-1}}{(1+\varepsilon)^{k-1}}.$$

Thus, if one starts with a value of $\epsilon=3\%$, then the $99^{th}$ percentile latency can be determined within an error of 3%.

To find the $99^{th}$ percentile, in box 253, we designate the leftmost frequency value of the leftmost range R in the frequency distribution 139 to begin a running total of the frequency values. This value is divided by the total number of data values 116 which is 100,000 in the scenario described above. Thus, we get a percentage value as a result that would compare with the 99 percent threshold in box 256. In box 259, if the calculated percentage exceeds the threshold percentage (99 percent), then the monitor application 136d proceeds to box 263. Otherwise, the monitor application 136d proceeds to box 266.

In box 263, a value associated with the range that is, in turn, associated with the threshold (i.e. 99% value) is output as providing the latency values associated with the threshold. If the worst case value (i.e. the upper limit of the range R in question) is greater than two seconds, then it is possible that the SLA was not complied with in the last five minutes. As such, appropriate action may be taken to ensure compliance in the future. Thereafter, the monitor application 136d ends as shown.

Alternatively, another value associated with the range R may be considered the ultimate value to be used when comparing with a given threshold (i.e. 2 seconds). Specifically, the value associated with the middle of the range R may be employed. Such a concern will depend upon the degree to which inaccuracy due to the ranges R may be tolerated in determining compliance with an SLA or for some other purpose.

Referring back to box 259, if the threshold has not been reached, then in box 266 the next frequency value that is adjacent to the currently considered frequency value for the range R to the right of the previously considered range R is added to the running total begun in box 253. Thereafter, this running total is divided by the total number of data values 116 received in order to obtain a new percentage for consideration in box 256. Thereafter, the monitor application 136d reverts back to box 256.

Thus, the flowchart of FIG. 6 describes how one may determine the maximum server latency that exists for 99 percent of the total server latencies received as data values 116 from the servers 103 using the frequency distribution 139. In this respect, rather than storing 100,000 values received from the servers 103, only the 4,096 values of the frequency distribution 139 need be maintained in the memory 126, thereby significantly reducing the memory usage. Thus, assuming that the error inherent in the exponential frequency distribution 139 is tolerable, the benefits of the reduced memory usage are available. The benefits are even greater where the number of data values 116 may be much greater than the 100,000 described above. For example, the number of data values 116 may be measured in Gigabytes or Terabytes. Also, the frequency distribution 139 of multiple time periods may be added together in order to obtain an overall frequency distribution 139 associated with larger periods of time as can be appreciated.

Referring back to FIG. 1, the memory 126 is defined herein as both volatile and nonvolatile memory and data storage components. Volatile components are those that do not retain data values upon loss of power. Nonvolatile components are those that retain data upon a loss of power. Thus, the memory 126 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

A number of software components are stored in the memory 126 and are executable by the processor 123. In this respect, the term "executable" means a program file that is in a form that can ultimately be run by the processor 123. Examples of executable programs may be, for example, a compiled program that can be translated into machine code in a format that can be loaded into a random access portion of the memory 126 and run by the processor 123, or source code that may be expressed in proper format such as object code that is capable of being loaded into a random access portion of the memory 126 and executed by the processor 123, etc. An executable program may be stored in any portion or component of the memory 126 including, for example, random access memory, read-only memory, a hard drive, compact disk (CD), floppy disk, or other memory components.

In addition, the processor 123 may represent multiple processors and the memory 126 may represent multiple memories that operate in parallel. In such a case, the local interface 129 may be an appropriate network that facilitates communication between any two of the multiple processors, between any processor and any one of the memories, or between any two of the memories, etc. The processor 123 may be of electrical construction, or of any other available construction.

With reference to FIGS. 1, 4, 5A, 5B, and 6, the various components of the monitor application 136 may be implemented using any one of a number of programming languages such as, for example, C, C++, JAVA, Perl, Python, Flash, or other programming languages.

With reference to FIGS. 4, 5A, 5B, and 6, although the monitor application 136 is described as being embodied in software or code executed by general purpose hardware as discussed above, as an alternative the same may also be embodied in dedicated hardware or a combination of software/general purpose hardware and dedicated hardware. If embodied in dedicated hardware, the monitor application 136 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flowcharts of FIGS. 4, 5A, 5B, and 6 show various examples of the functionality and operation of an implementation of the monitor application 136. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 4, 5A, 5B, and 6 show a specific order of execution, it is understood that the order of execution may differ from that which is depicted. For example, the order of execution of two or more blocks may be scrambled relative to the order shown. Also, two or more blocks shown in succession in FIGS. 4, 5A, 5B, and 6 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the monitor application 136 comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the monitor application 136 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method, comprising the steps of:
receiving a stream of monitoring values in a host from a plurality of external hosts over a predefined period of time;
storing up to an initial quantity of the monitoring values received in the host, where identical ones of the monitoring values are consolidated into a single value;
creating a frequency distribution in the host after the initial quantity of the monitoring values is received, where any single value is counted in the initial quantity as equivalent to one of the monitoring values, the initial quantity being equal to a total number of ranges in the frequency distribution, the frequency distribution comprising a plurality of ranges that vary exponentially and a plurality of frequency values, each of the frequency values being associated with a corresponding one of the ranges; wherein an exponential variation of the ranges is based at least upon an acceptable relative error in the values for each of the ranges and the acceptable relative error is based at least upon an upper limit of the ranges and a number of ranges;
tracking a frequency at which the monitoring values fall within respective ones of the ranges in the frequency distribution by incrementing the frequency value associated with a respective one of the ranges for each of the monitoring values received in the host;
discarding each respective monitoring value after incrementing a corresponding one of the frequency values; and
expanding the frequency distribution when one of the monitoring values falls outside an upper limit of the frequency distribution.

2. The method of claim 1, where the frequency distribution is expanded without increasing a total number of the ranges.

3. The method of claim 1, where the step of expanding the frequency distribution further comprises the step of adding a plurality of new ranges to the frequency distribution.

4. The method of claim 1, where the frequency distribution is expanded without increasing a total number of the ranges.

5. The method of claim 1, where the step of expanding the frequency distribution further comprises the step of adding a plurality of new ranges to the frequency distribution.

6. The method of claim 1, where the step of expanding the frequency distribution further comprises the step of storing up to an initial quantity of the monitoring values in the host that fall outside an upper limit of the frequency distribution.

7. The method of claim 6, where the initial quantity is equal to a total number of ranges to be added to the frequency distribution.

8. A method, comprising the steps of:
receiving a stream of monitoring values in a host from a plurality of external hosts;
storing a frequency distribution in the host, the frequency distribution comprising a plurality of ranges that vary exponentially, and a plurality of frequency values, each of the frequency values being associated with a corresponding one of the ranges; wherein an exponential variation of the ranges is based at least upon an acceptable relative error in the values for each of the ranges and the acceptable relative error is based at least upon an upper limit of the ranges and a number of ranges;
tracking a frequency at which the monitoring values fall within respective ones of the ranges in the frequency distribution; and
expanding the frequency distribution when one of the monitoring values falls outside an upper limit of the frequency distribution.

9. The method of claim 8, wherein the step of tracking the frequency that the monitoring values fall within respective ones of the ranges in the frequency distribution further comprises incrementing the frequency value associated with a respective one of the ranges for each of the monitoring values received in the host.

10. The method of claim 9, further comprising the step of discarding each respective monitoring value after incrementing a corresponding one of the frequency values.

11. The method of claim 8, where the stream of monitoring values is received over a predetermined period of time, the method further comprising the steps of:
storing the monitoring values until an initial quantity of the monitoring values is less than a total number of ranges of the frequency distribution; and
creating the frequency distribution after the initial quantity of the monitoring values exceeds the total number of ranges of the frequency distribution.

12. The method of claim 11, where identical ones of the monitoring values are consolidated into a single value, where the single value is counted in the initial quantity as equivalent to one of the monitoring values.

13. A system, comprising:
a host configured to receive a stream of monitoring values generated by a plurality of external hosts;
a frequency distribution created in the host, the frequency distribution comprising a plurality of ranges that vary exponentially, and a plurality of frequency values, each of the frequency values being associated with a corresponding one of the ranges; wherein an exponential variation of the ranges is based at least upon an acceptable relative error in the values for each of the ranges and the acceptable relative error is based at least upon an upper limit of the ranges and a number of ranges; and
a monitoring system associated with the host configured to track a frequency at which the monitoring values fall within respective ones of the ranges in the frequency distribution; wherein
the monitoring system is configured to expand the frequency distribution when one of the monitoring values falls outside an upper limit of the frequency distribution.

14. The system of claim 13, wherein:
the monitoring system tracks the frequency that the monitoring values fall within respective ones of the ranges in the frequency distribution by incrementing the frequency value associated with a respective one of the ranges for each of the monitoring values received in the host; and
each respective monitoring value is discarded after incrementing a corresponding one of the frequency values.

15. The system of claim 13, where each of the monitoring values represents a response latency of a server with respect to a request from a client.

16. The system of claim 13, where each of the monitoring values represents a file size of a file served up to a client by a server.

17. The system of claim 13, where the frequency distribution is expanded without increasing a total number of the ranges.

18. The system of claim 13, where the frequency distribution is expanded by adding a plurality of new ranges to the frequency distribution.

19. The system of claim 13, where the frequency distribution is expanded by storing up to an initial quantity of the monitoring values that fall outside an upper limit of the frequency distribution.

20. The system of claim 19, where the initial quantity is equal to a total number of ranges to be added to the frequency distribution.

21. The system of claim 13, where the stream of monitoring values is received over a predetermined period of time, and the monitoring system is further configured to store an initial quantity of the monitoring values.

22. The system of claim 21, where the initial quantity is equal to a total number of ranges in the frequency distribution.

23. The system of claim 21, where identical ones of the monitoring values are consolidated into a single value, where the single value is counted in the initial quantity as equivalent to one of the monitoring values.

* * * * *